(12) United States Patent
Kottegoda et al.

(10) Patent No.: US 12,499,746 B2
(45) Date of Patent: Dec. 16, 2025

(54) SYSTEMS AND METHODS FOR DISTURBANCE DETECTION AND IDENTIFICATION BASED ON DISTURBANCE ANALYSIS

(71) Applicant: Allstate Insurance Company, Northbrook, IL (US)

(72) Inventors: Manjula Kottegoda, Northbrook, IL (US); Corina Florescu, Northbrook, IL (US); Deepak Baban Giri, Northbrook, IL (US)

(73) Assignee: Allstate Insurance Company, Northbrook, IL (US)

( * ) Notice: Subject to any disclaimer, the term of this patent is extended or adjusted under 35 U.S.C. 154(b) by 0 days.

(21) Appl. No.: 18/635,623

(22) Filed: Apr. 15, 2024

(65) Prior Publication Data

US 2025/0014442 A1    Jan. 9, 2025

Related U.S. Application Data

(63) Continuation of application No. 18/177,898, filed on Mar. 3, 2023, now Pat. No. 11,984,011, which is a
(Continued)

(51) Int. Cl.
G08B 21/18    (2006.01)
G06N 3/04     (2023.01)
G06N 3/08     (2023.01)

(52) U.S. Cl.
CPC ............... *G08B 21/18* (2013.01); *G06N 3/04* (2013.01); *G06N 3/08* (2013.01)

(58) Field of Classification Search
CPC ............. G08B 21/18; G06N 3/04; G06N 3/08
(Continued)

(56) References Cited

U.S. PATENT DOCUMENTS 8,630,741 B1 * 1/2014 Matsuoka ............... F24F 11/88
                                                          700/12
9,069,737 B1 * 6/2015 Kimotho ............... G06F 11/079
(Continued)

FOREIGN PATENT DOCUMENTS

CN    101840700 B    5/2012
CN    103118173 A    5/2013

OTHER PUBLICATIONS

Maggie Tillman, Alexa Guard explained: How it works and how to get it for your Echo device, published May 14, 2019, available at https://www.pocket-lint.com/smart-home/news/amazon/148044-what-is-alexa-guard-and-how-does-it-work (accessed Apr. 1, 2020).
(Continued)

*Primary Examiner* — Omar Casillashernandez
(74) *Attorney, Agent, or Firm* — Dinsmore & Shohl LLP

(57) ABSTRACT

Intelligent disturbance detection systems and methods of use to capture a disturbance via an application tool on a mobile smart device remote from the user, extract features from the disturbance, compare the extracted features to disturbance labels of a disturbance set in a comparison by a disturbance detection neural network model of the application tool, generate a disturbance label when the extracted features match the disturbance label in the comparison, train the model to generate a custom disturbance label associated with the extracted features when the extracted features do not match the one or more disturbance labels in the comparison, and generate an automatic alert via the mobile smart device to transmit an identification of the disturbance to the user based on the disturbance label, the custom disturbance label, or combinations thereof.

15 Claims, 8 Drawing Sheets

Related U.S. Application Data continuation of application No. 16/985,602, filed on Aug. 5, 2020, now Pat. No. 11,620,895.

(58) Field of Classification Search
USPC .................................................. 340/539.11
See application file for complete search history.

(56) References Cited

U.S. PATENT DOCUMENTS

| | | | |
|---|---|---|---|
| 9,197,736 B2 | 11/2015 | Davis et al. | |
| 10,490,184 B2* | 11/2019 | Jeon ........................ | G10L 15/14 |
| 10,831,189 B2* | 11/2020 | Kim ..................... | G05D 1/0055 |
| 2006/0017559 A1* | 1/2006 | Albert .................... | G08B 21/22 |
| | | | 340/521 |
| 2012/0319844 A1* | 12/2012 | van Doorn ............ | G01S 13/003 |
| | | | 340/541 |
| 2017/0154241 A1* | 6/2017 | Shambik ................ | G06V 20/58 |
| 2018/0108369 A1* | 4/2018 | Gross ..................... | G06N 3/084 |
| 2018/0302420 A1* | 10/2018 | Nakanelua .............. | H04L 43/16 |
| 2019/0130337 A1* | 5/2019 | Nafus .............. | G06Q 10/06398 |
| 2019/0154032 A1* | 5/2019 | Pal ........................ | G01M 3/025 |
| 2019/0163817 A1* | 5/2019 | Milenova ................ | G06F 16/35 |
| 2020/0117897 A1* | 4/2020 | Froloff ................... | G06N 20/20 |
| 2020/0225673 A1* | 7/2020 | Ebrahimi Afrouzi ....................... | |
| | | | A47L 11/4011 |
| 2020/0334282 A1* | 10/2020 | Dasgupta ............... | G06N 3/045 |
| 2020/0342747 A1* | 10/2020 | Lisewski ................ | G08B 21/22 |
| 2021/0091866 A1* | 3/2021 | Zhang .................. | H04B 17/309 |
| 2021/0103006 A1* | 4/2021 | Menzel ................. | H02J 3/0012 |
| 2021/0309183 A1* | 10/2021 | Bielby ................. | B60R 16/037 |
| 2022/0067090 A1* | 3/2022 | Jain ........................ | G06F 16/686 |

OTHER PUBLICATIONS

Alexa Can Help You Guard Your Home, available at https://www.amazon.com/b?ie=18021383011 (accessed Apr. 1, 2020).

Erika Rawes, What You Need to Know Before You Enable Alexa Guard, published Mar. 16, 2020, available at https://www.digitaltrends.com/home/enable-alexa-guard/ (accessed Apr. 1, 2020).

* cited by examiner

SYSTEMS AND METHODS FOR DISTURBANCE DETECTION AND IDENTIFICATION BASED ON DISTURBANCE ANALYSIS

CROSS-REFERENCE TO RELATED APPLICATIONS

This application is a continuation of U.S. patent application Ser. No. 18/177,898, filed Mar. 3, 2023, entitled "Systems and Methods for Disturbance Detection and Identification Based on Disturbance Analysis," which is a continuation of U.S. patent application Ser. No. 16/985,602, filed Aug. 5, 2020, issued as U.S. Pat. No. 11,620,895 on Apr. 4, 2023, entitled "Systems And Methods For Disturbance Detection And Identification Based On Disturbance Analysis." The contents of the above noted applications are hereby incorporated by reference in their entirety.

TECHNICAL FIELD

The present disclosure relates to automated disturbance detection and identification solutions and, in particular, systems and methods for automated disturbance detection and disturbance identification based on intelligent disturbance analysis.

BACKGROUND

Older models of smart devices tend to be recycled or otherwise discarded upon a user purchasing a newer model. Such devices, however, are still capable of being used with their computational architecture for different applications. Accordingly, a need exists for alternative solutions to repurpose and utilize the older models of the smart devices.

BRIEF SUMMARY

According to the subject matter of the present disclosure, an intelligent disturbance detection system may include a mobile smart device remote from a user, an application tool downloaded on the mobile smart device, the application tool comprising a disturbance detection neural network model and a disturbance set, the disturbance set comprising one or more disturbance labels, one or more processors communicatively coupled to the application tool, one or more memory components communicatively coupled to the one or more processors, and machine readable instructions stored in the one or more memory components. The machine readable instructions may cause the intelligent disturbance detection system to perform at least the following when executed by the one or more processors: capture a disturbance comprising a sound, an image, or combinations thereof via the application tool on the mobile smart device remote from the user, extract features from the disturbance to generate one or more extracted features, compare the one or more extracted features to the one or more disturbance labels in a comparison by the disturbance detection neural network model, and generate a disturbance label from the one or more disturbance labels when the one or more extracted features match the disturbance label in the comparison. The machine readable instructions may further cause the intelligent disturbance detection system to perform at least the following when executed by the one or more processors: train the disturbance detection neural network model to generate a custom disturbance label associated with the one or more extracted features when the one or more extracted features do not match the one or more disturbance labels in the comparison, and generate an automatic alert via the mobile smart device to transmit an identification of the disturbance to the user based on the disturbance label, the custom disturbance label, or combinations thereof.

According to another embodiment of the present disclosure, a method of implementing an intelligent disturbance detection system may include capturing a disturbance comprising a sound, an image, or combinations thereof via an application tool on a mobile smart device of the intelligent disturbance detection system remote from a user, extracting features from the disturbance to generate one or more extracted features, comparing the one or more extracted features to one or more disturbance labels of a disturbance set in a comparison by a disturbance detection neural network model of the application tool, generating a disturbance label from the one or more disturbance labels when the one or more extracted features match the disturbance label in the comparison. The method may further include training the disturbance detection neural network model to generate a custom disturbance label associated with the one or more extracted features when the one or more extracted features do not match the one or more disturbance labels in the comparison, and generating an automatic alert via the mobile smart device to transmit an identification of the disturbance to the user based on the disturbance label, the custom disturbance label, or combinations thereof.

According to yet another embodiment of the present disclosure, a method of implementing an intelligent disturbance detection system may include capturing a disturbance comprising a sound, an image, or combinations thereof via an application tool on a mobile smart device of the intelligent disturbance detection system remote from a user, extracting features from the disturbance to generate one or more extracted features, comparing the one or more extracted features to one or more disturbance labels of a disturbance set in a comparison by a disturbance detection neural network model of the application tool, generating a disturbance label from the one or more disturbance labels when the one or more extracted features match the disturbance label in the comparison, and training the disturbance detection neural network model to generate a custom disturbance label associated with the one or more extracted features when the one or more extracted features do not match the one or more disturbance labels in the comparison. The method may further include generating an automatic alert via the mobile smart device to transmit an identification of the disturbance to the user based on the disturbance label, the custom disturbance label, or combinations thereof, wherein the automatic alert comprises a timestamp and a confidence level associated with the identification of the disturbance.

Although the concepts of the present disclosure are described herein with primary reference to a disturbance detection solution of a home environment, it is contemplated that the concepts will enjoy applicability to any setting for purposes of disturbance detection solutions, such as alternative business settings or otherwise.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

In embodiments described herein and in greater detail below, an intelligent disturbance detection module includes machine learning functionality to implement systems and methods to generate a disturbance identification and automated alert regarding the disturbance identification. The embodiments herein are directed to a functionality for a mobile smart device to employ an artificial intelligence model on an application tool for disturbance detection by the mobile smart device. By way of example, and not as a limitation, a mobile smart device that a user no longer carries may stay in a home environment to detect sounds or images of disturbances via the application tool as described herein. The artificial intelligence model may capture a disturbance, such as a sound or image, extract features from the sound or image, match the extracted features to a model trained data set, apply a type of disturbance label from the match, and generate an alert to a user, such as via text or email, based on the type of disturbance label to notify the user of the disturbance. As non-limiting examples, such sounds may be a dog barking, a fire alarm, or a doorbell ringing. Signals of disturbances may be processed and features extracted by the application tool as described herein, which may be based on computer programming languages such as Python or other suitable programming languages as understood by those skilled in the art and may be designed using Java, Android Studio, or other suitable design environments as understood by those skilled in the art. Although the disturbances are described herein as a sound or image, it is within the scope of the present disclosure and should be understood that such disturbances may also be a combination of one or more sounds, a combination of one or more images, or combinations thereof.

In some embodiments, a confidence value may be applied to the match prior to generating the alert such that only alerts above a confidence threshold are transmitted. Additionally or alternatively, the confidence level associated with the generated alert may be transmitted. Further, a user may customize selection of which labels are to generate alerts to the user. Moreover, a user may train the model to recognize and label customized sounds. For example, such a customized sound may be of a door opening. Further, the application tool may be set to monitor for the detected disturbances at predetermined time periods. In some embodiments, an insurance company system may be coupled to a plurality of application tools in a predetermined area to receive the alerts and generate metrics to determine parameters such as a safety in an area based on a number of alerts of one or more types of disturbance labels received.

Figure 1:
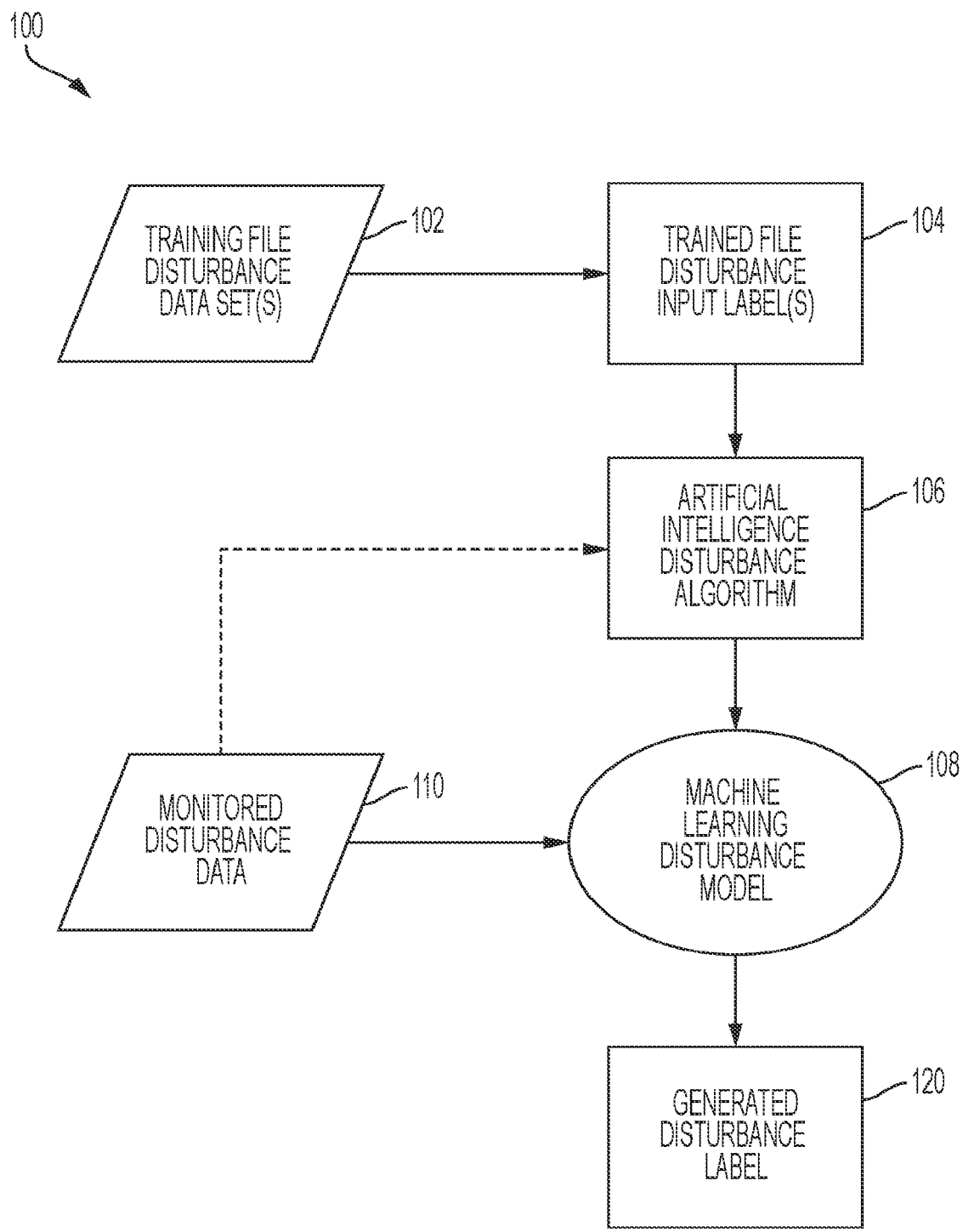
FIG. 1 illustrates a control scheme of an intelligent disturbance detection solution utilizing an artificial intelligence disturbance model including a machine learning functionality, according to one or more embodiments shown and described herein.

Referring to FIG. 1, an intelligent disturbance detection solution 100 includes one or more training file disturbance data sets 102, one or more trained file disturbance input labels 104, artificial intelligence disturbance algorithm 106, a machine learning disturbance detection model 108, monitored disturbance data 110, and one or more generated disturbance labels 120.

The machine learning disturbance detection model 108 utilizes the artificial intelligence disturbance algorithm 106 to generate the one or more generated disturbance labels 120 associated with the monitored disturbance data 110. The machine learning disturbance detection model 108 and the artificial intelligence disturbance algorithm 106 are trained using the one or more training file disturbance data sets 102 that are associated during training with the one or more trained file disturbance input labels 104. Thus, during training, a disturbance as input from the one or more training file disturbance data sets 102 is associated with a trained filed disturbance input label 104 to classify the disturbance as a labeled and identified disturbance that is detected and generated as a generated disturbance label 120.

Additionally, the machine learning disturbance detection model 108 is configured to utilize one or more disturbances from the monitored disturbance data 110 that is not associated with the one or more trained file disturbance input labels 104 to generate one or more associated custom disturbance labels to add to the one or more trained file disturbance input labels 104.

Figure 2:
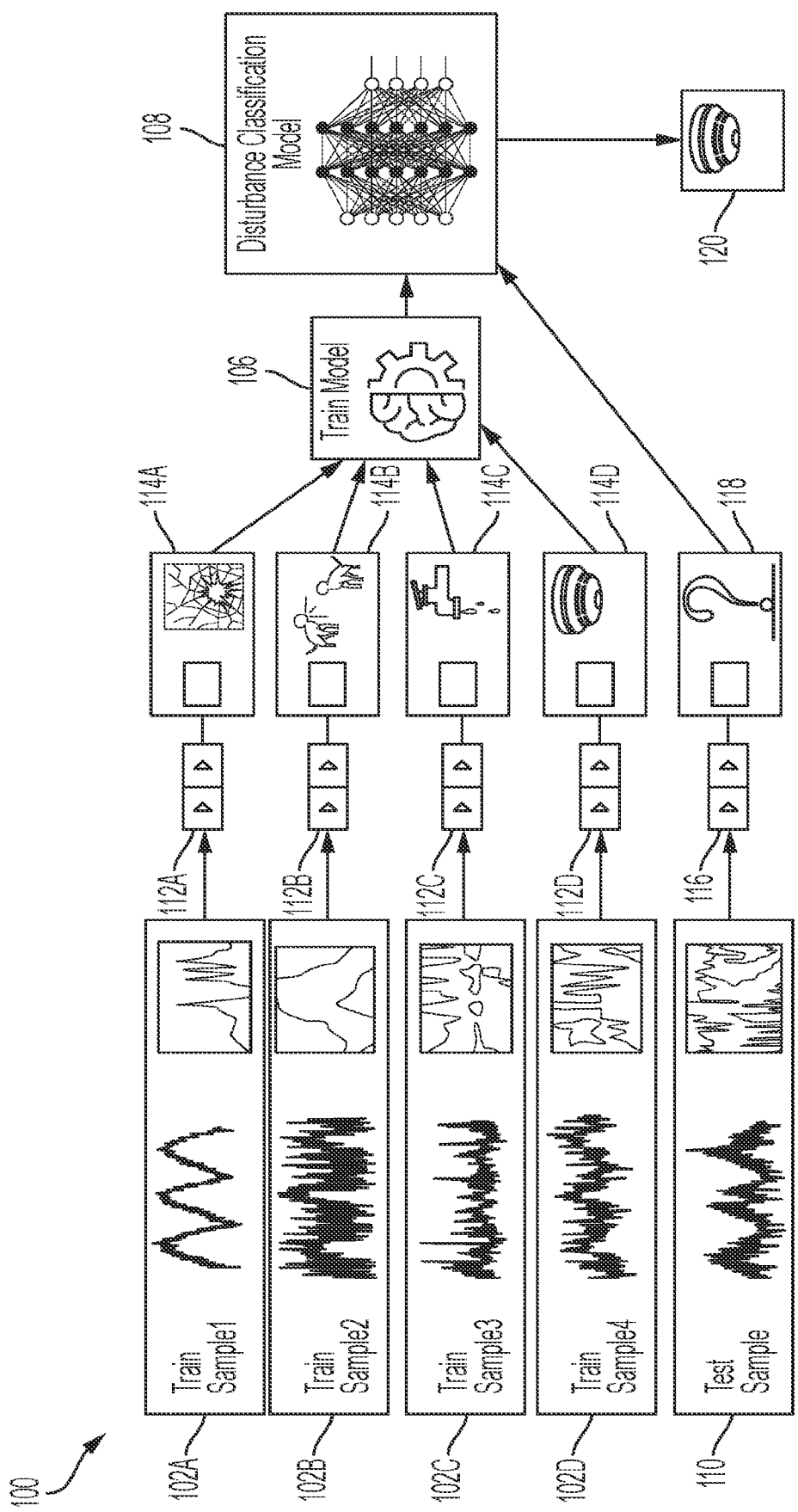
FIG. 2 illustrates a schematic view of the intelligent disturbance detection solution of FIG. 1, according to one or more embodiments shown and described herein.

FIG. 2 illustrates a sub-level embodiment of the intelligent disturbance detection solution 100 of FIG. 1 including a plurality of training samples 102A, 102B, 102C, and 102D as the one or more training file disturbance data sets 102. The disturbances may include captured sounds, images, or combinations thereof. The plurality of training samples 102A, 102B, 102C, and 102D include, for example, audio waveforms and corresponding audio spectrograms from which features 112A, 112B, 112C, and 112D are respectively extracted. While described in terms of audio waveforms and audio spectrograms, it should be understood that training samples 102 and/or test sample 110 may take a variety of other forms. The extracted features 112A, 112B, 112C, and 112D, correspond to labels 114A, 114B, 114C, 114D such that the artificial intelligence disturbance algorithm 106 is trained to recognize labels 114 to associate with extracted features 112. By way of example, and not as a limitation, the extracted features 112A, 112B, 112C, and 112D may respectively correspond in FIG. 2 to labels of glass breaking, a dog barking, a faucet dripping, and a fire alarm (and/or a carbon monoxide alarm). The one or more generated disturbance labels 120 may be associated with the extracted features 112A, 112B, 112C, and 112D to identify and label a type of disturbance having an associated disturbance label with each extracted feature. The artificial intelligence disturbance algorithm 106 is trained utilizing the one or more generated disturbance labels 120 to learn to determine whether a new monitored disturbance as the monitored disturbance data 110 corresponds to one of the one or more generated disturbance labels 120.

The machine learning disturbance detection model 108 utilizes the trained artificial intelligence disturbance algorithm 106 to generate the one or more generated disturbance labels 120 to identify one or more disturbance inputs as the monitored disturbance data 110. As shown in FIG. 2, a test sample as a disturbance input as the monitored disturbance data 110 includes an associated audio waveform and audio spectrogram from which features 116 are extracted. To determine a label 118 to associate with the disturbance input of the monitored disturbance data 110, the machine learning disturbance detection model 108 applies the trained artificial intelligence disturbance algorithm 106 to generate the generated disturbance label 120 associated with the monitored disturbance data 110. The machine learning disturbance detection model 108 may apply the trained artificial intelligence disturbance algorithm 106 and not find a match to generate the generated disturbance label 120 associated with the monitored disturbance data 110. In such embodiments, the artificial intelligence disturbance algorithm 106 may be further trained to input the monitored disturbance data 110 as a customized disturbance to associated with a customized disturbance label.

Figure 3A:
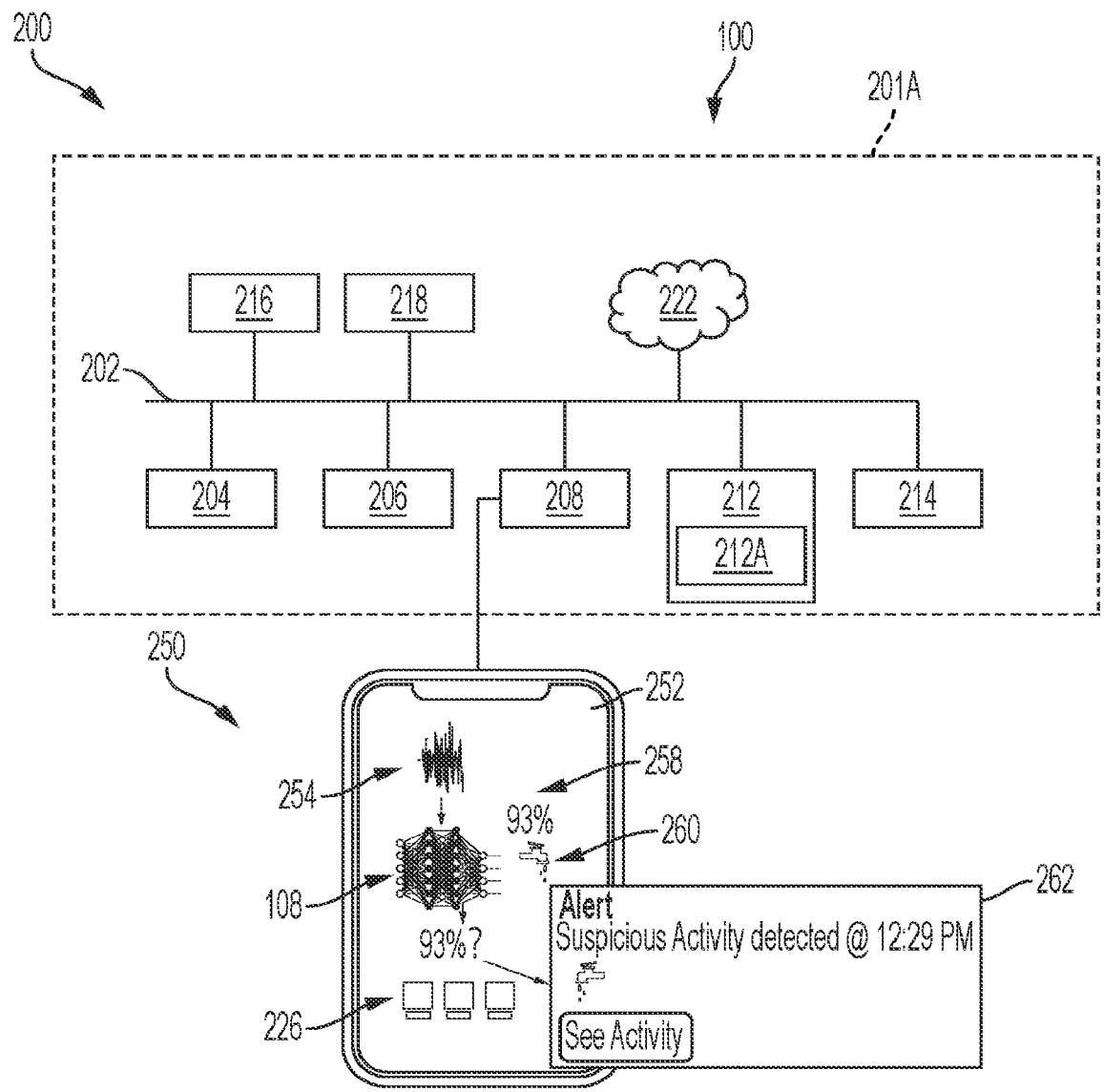
FIG. 3A illustrates a computer implemented system having a self-contained architecture, the system including an intelligent disturbance detection module for use with the process flows described herein and the intelligent disturbance detection solution of FIGS. 1-2, along with a screen view for an alert generated by the intelligent disturbance detection module, according to one or more embodiments shown and described herein.
Figure 3B:
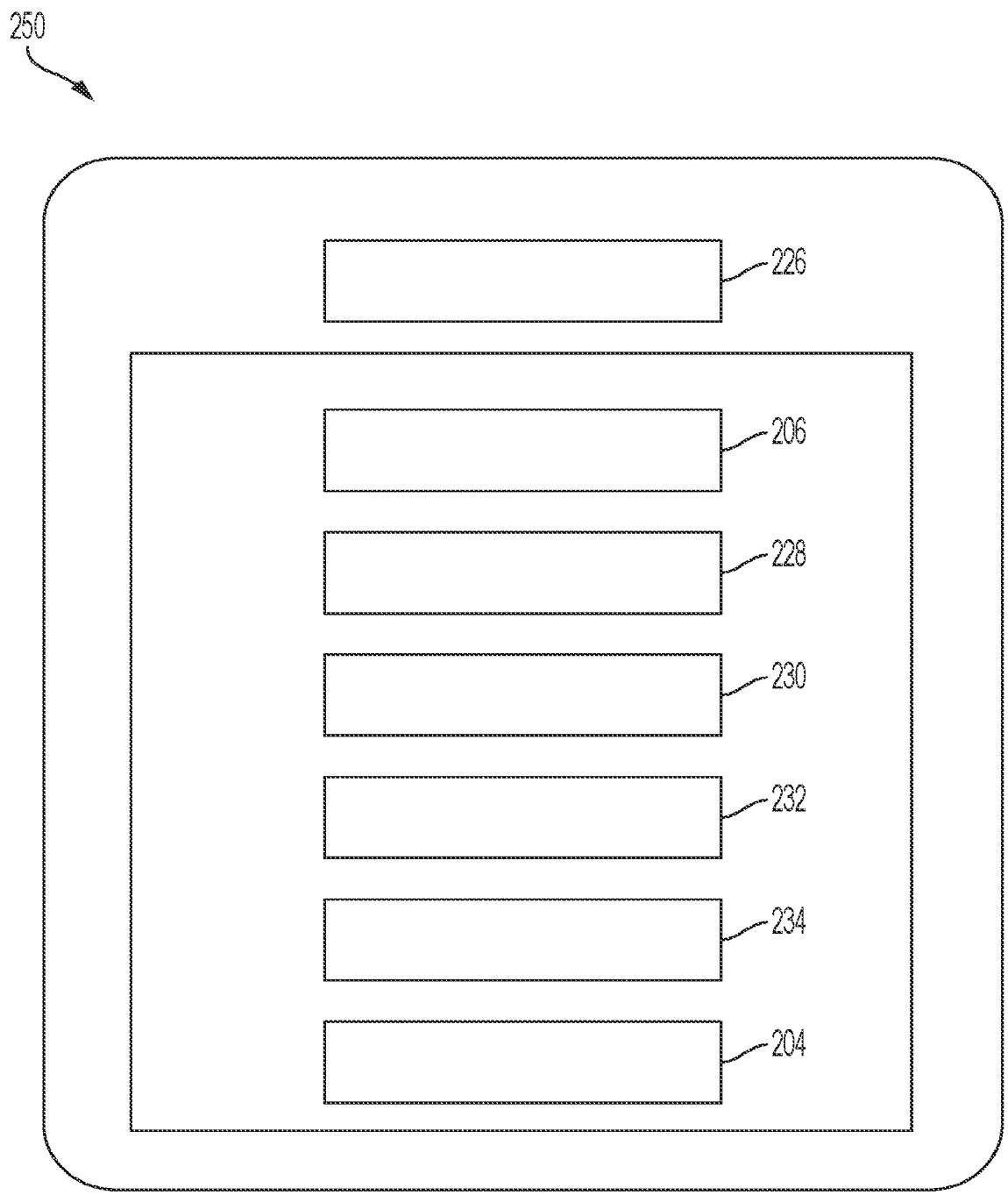
FIG. 3B illustrates a smart device sub-system of the self-contained architecture system of FIG. 3A.
Figure 3C:
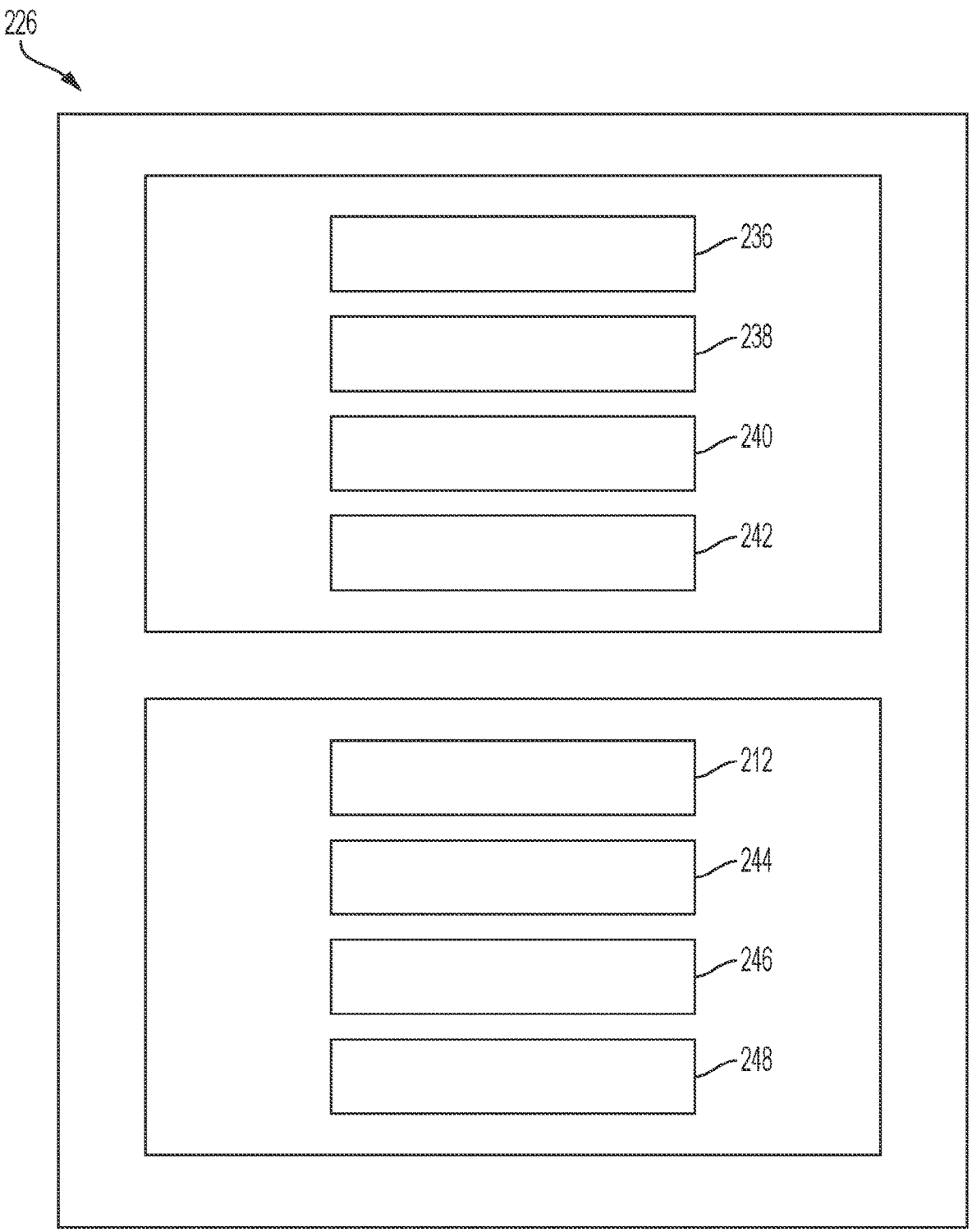
FIG. 3C illustrates an application tool sub-system of the self-contained architecture system of FIG. 3A.
Figure 3D:
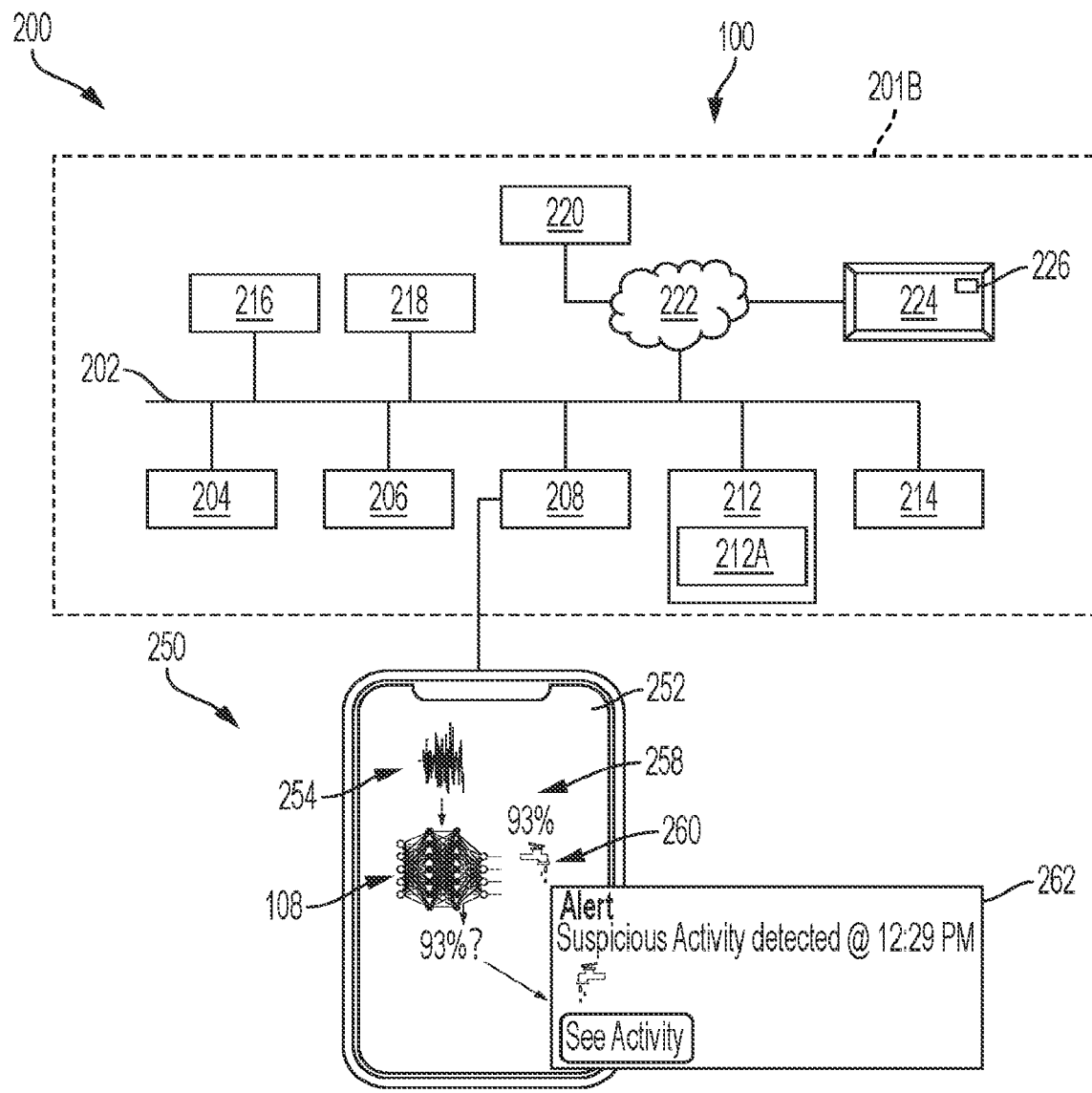
FIG. 3D illustrates another computer implemented system having an external communication architecture broader than the self-contained architecture of FIG. 3A and configured to operate with the smart device and application tool sub-systems of FIGS. 3B-3C, according to one or more embodiments shown and described herein.

FIG. 3A illustrates a computer implemented intelligent disturbance detection system 200 having a self-contained architecture for use with the processes described herein, such as a process 300 of FIG. 5, as described in greater detail below. FIG. 3B, which will be described in greater detail further below, illustrates a smart device sub-system of the mobile smart device 250 to operate within the system 200 of FIG. 3A. FIG. 3C, also described in greater detail below, illustrates an application tool-subsystem to operate within the system 200 of FIG. 3A. FIG. 3D illustrates another computer implemented system 200 having an external communication architecture broader than the self-contained architecture of FIG. 3A and is similar to the system 200 of FIG. 3A as described herein with differences such as a server 220 and computing device 224 remote from the mobile smart device 250 noted in greater detail with respect to FIG. 3D below. The smart device and application tool subsystems of FIGS. 3B and 3C are configured to also operate with respect to the system 200 of FIG. 3D. In the system embodiments described herein, the systems may include one or more variations of (1) a closed system associated with and self-contained to a single device including an application tool as described herein in an environment, such as a house, (2) a closed system associated with and self-contained to multiple devices sharing a common user account associated with the application tool 226 in the environment, (3) a closed system associated with and self-contained to multiple devices under a plurality of shared or linked user accounts, such as between family members, associated with the application tool 226 in the environment, (4) an open system in which the application tool 226 may share predicted events but not customized labels, or (5) an open system in which the application tool 226 may share predicted events and/or customized labels with a big data architecture external the application tool 226. In the open systems, the application tool 226 may communicate to a central server 220, such as the central server 220 of FIG. 3D, to receive and transmit, for example, software updates, backup trained sounds, sharing of trained data with a family member, additional computing power, and/or other suitable system data.

Referring to FIG. 3A, with respect to one or more self-contained closed system embodiments, a non-transitory, intelligent disturbance detection system 200 for implementing a computer and software-based method, such as directed by the intelligent disturbance detection solution 100 and the processes described herein, to automatically generate the one or more generated disturbance labels 120 to identify monitored and detected disturbances as described herein. The intelligent disturbance detection system 200 comprises an intelligent disturbance detection module 201A of the self-contained architecture as a component of the machine learning disturbance detection model 108 of FIG. 1 to generate the one or more generated disturbance labels 120. With respect to the self-contained architecture of the intelligence disturbance detection module 201A of FIG. 3A, once an application tool 226 is downloaded to the mobile smart device 250 through a network 222, the mobile smart device 250 is configured to operate the application tool 226 as described herein without any outside communicative connections to external communication devices or system.

The intelligent disturbance detection system 200 further comprises a communication path 202, one or more processors 204, a non-transitory memory component 206, a disturbance capture module 208 to capture a monitored disturbance from monitored disturbance data 110, an disturbance detection analytics module 212, a disturbance detection training model module 212A of the disturbance detection analytics module 212, a storage or database 214, a machine learning module 216, a network interface hardware 218, and a network 222, and an application tool 226 as an "app" downloaded on or otherwise communicatively coupled to the mobile smart device 250. In some embodiments, the intelligent disturbance detection system 200 is implemented using a wide area network (WAN) or network 222, such as an intranet or the internet and the application tool 226 is downloaded via the network 222. Once downloaded on a mobile smart device 250, the disturbance detection model 108 is run on the mobile smart device 250 via the application tool 226 and may be configured to receive monitored disturbance data 110 and create new labels 120 unique to an environment in which the mobile smart device 250 is disposed. By way of example, and not as a limitation, the environment may be a home environment, and the new label 120 may be a sound associated with a creaky door in the home environment that sounds different from a creaky door in a training sample. The various components of the intelligent disturbance detection system 200 and the interaction thereof will be described in detail below. The disturbance capture module 208 is configured to receive one or more disturbances as the monitored disturbance data 110. The monitored disturbance data 110 may be initially be captured and transmitted through a camera 232 and/or microphones 234 on the mobile smart device 250 as shown in FIG. 3B. As a non-limiting example, the mobile smart device 250 may be a smartphone including the application tool 226 configured to use the machine learning disturbance detection model 108 to generate the one or more generated disturbance labels 120 as described herein.

As shown in FIG. 3A, the mobile smart device 250 may capture a disturbance as monitored disturbance data 110 associated with a waveform 254 that is analyzed by the machine learning disturbance detection model 108 through analysis 256 to generate a disturbance label 260 associated with the disturbance, such as an image and/or disturbance type, and an associated confidence level 258. In FIG. 3A, the disturbance is determined in a determination to be dripping water from a faucet as shown by the disturbance label 260 with a confidence level 258 of 93% associated with the determination. An alert 262 is further generated associated with the determination of the detected and identified disturbance. In FIG. 3A, the dripping faucet disturbance is determined to have occurred at 12:29 p.m., and a See Activity feature may be available to select to learn further information about the disturbance detection and determination.

Figure 4:
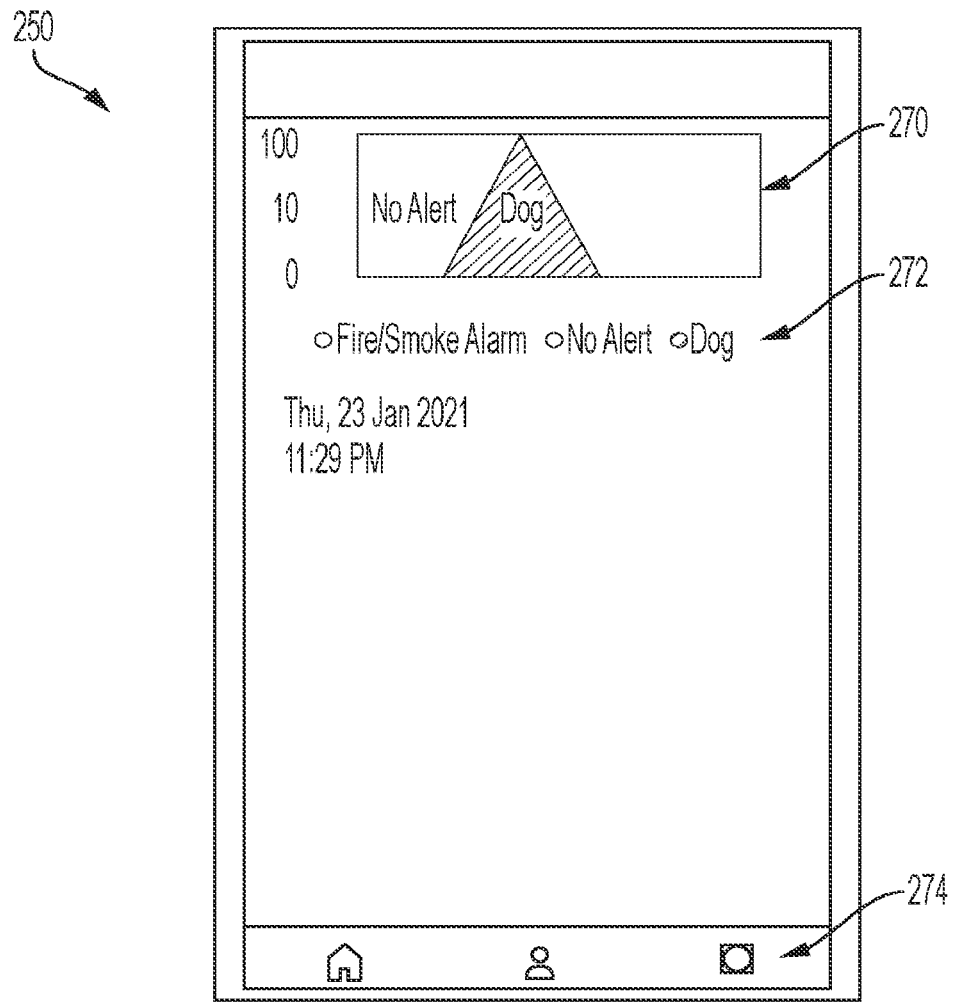
FIG. 4 illustrates a screen view of a mobile smart device utilized for a disturbance detection and generated by the intelligent disturbance detection module of FIG. 3, according to one or more embodiments shown and described herein.

FIG. 4 illustrates a screen view of a mobile smart device 250 utilized for a disturbance detection and generated by the intelligent disturbance detection analytics module 212 and intelligent disturbance detection system 200 of FIG. 3A or FIG. 3D. The screen view shows a display graph 270 of detected disturbances 272 and an associated timestamp. The screen view further shows a selection bar 274 including icons to select and configured to direct an individual selecting the icon to different components of the application tool 226, such as a monitor component configured to start monitoring the disturbance data 110. In the embodiment of FIG. 4, the detected disturbances are shown as fire/smoke alarm, no alert (i.e., no disturbance detected), and dog with associated confidence levels of the disturbance detection determinations shown in the display graph 270.

The intelligent disturbance detection system 200 comprises the communication path 202. The communication path 202 may be formed from any medium that is capable of transmitting a signal such as, for example, conductive wires, conductive traces, optical waveguides, or the like, or from a combination of mediums capable of transmitting signals. The communication path 202 communicatively couples the various components of the intelligent disturbance detection system 200. As used herein, the term "communicatively coupled" means that coupled components are capable of exchanging data signals with one another such as, for example, electrical signals via conductive medium, electromagnetic signals via air, optical signals via optical waveguides, and the like.

The intelligent disturbance detection system 200 of FIG. 3A also comprises the processor 204. The processor 204 can be any device capable of executing machine readable instructions. Accordingly, the processor 204 may be a controller, an integrated circuit, a microchip, a computer, or any other computing device. The processor 204 is communicatively coupled to the other components of the intelligent disturbance detection system 200 by the communication path 202. Accordingly, the communication path 202 may communicatively couple any number of processors with one another, and allow the modules coupled to the communication path 202 to operate in a distributed computing environment. Specifically, each of the modules can operate as a node that may send and/or receive data.

The illustrated system 200 further comprises the memory component 206 which is coupled to the communication path 202 and communicatively coupled to the processor 204. The memory component 206 may be a non-transitory computer readable medium or non-transitory computer readable memory and may be configured as a nonvolatile computer readable medium. The memory component 206 may comprise RAM, ROM, flash memories, hard drives, or any device capable of storing machine readable instructions such that the machine readable instructions can be accessed and executed by the processor 204. The machine readable instructions may comprise logic or algorithm(s) written in any programming language such as, for example, machine language that may be directly executed by the processor, or assembly language, object-oriented programming (OOP), scripting languages, microcode, etc., that may be compiled or assembled into machine readable instructions and stored on the memory component 206. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Still referring to FIG. 3A, as noted above, the intelligent disturbance detection system 200 comprises the display such as a graphical user interface (GUI) on a screen of the computing device 224 for providing visual output such as, for example, information, graphical reports, messages, or a combination thereof. The display on the screen of the mobile smart device 250 is coupled via an internal communication path 202 to the processor 204 of the mobile smart device 250. Accordingly, the communication path 202 communicatively couples the display to other modules of the intelligent disturbance detection system 200. The display can comprise any medium capable of transmitting an optical output such as, for example, a cathode ray tube, light emitting diodes, a liquid crystal display, a plasma display, or the like. Additionally, it is noted that the display or the computing device 224 can comprise at least one of the processor 204 and the memory component 206.

The intelligent disturbance detection system 200 comprises the disturbance detection analytics module 212 as described above to at least apply data analytics and artificial intelligence algorithms and models to received disturbances, such as sounds, videos, images, or combinations thereof, and the machine learning module 216 for providing such artificial intelligence algorithms and models. The machine learning module 216 may include an artificial intelligence component to automatically, and after the disturbance detection analytics module 212 is implemented via the application tool 226, train and provide machine learning capabilities via machine learning techniques to a neural network as described herein.

By way of example, and not as a limitation, the neural network may utilize one or more artificial neural networks (ANNs). In ANNs, connections between nodes may form a directed acyclic graph (DAG). ANNs may include node inputs, one or more hidden activation layers, and node outputs, and may be utilized with activation functions in the one or more hidden activation layers such as a linear function, a step function, logistic (sigmoid) function, a tanh function, a rectified linear unit (ReLu) function, or combinations thereof. ANNs are trained by applying such activation functions to training data sets to determine an optimized solution from adjustable weights and biases applied to nodes within the hidden activation layers to generate one or more outputs as the optimized solution with a minimized error. In machine learning applications, new inputs may be provided (such as the generated one or more outputs) to the ANN model as training data to continue to improve accuracy and minimize error of the ANN model. The one or more ANN models may utilize one to one, one to many, many to one, and/or many to many (e.g., sequence to sequence) sequence modeling. The intelligent disturbance detection system 200 may utilize one or more ANN models as understood to those skilled in the art or as yet-to-be-developed to generate disturbance labels and alerts as described in embodiments herein. Such ANN models may include artificial intelligence components selected from the group that may include, but not be limited to, an artificial intelligence engine, Bayesian inference engine, and a decision-making engine, and may have an adaptive learning engine further comprising a deep neural network learning engine. The one or more ANN models may employ a combination of artificial intelligence techniques, such as, but not limited to, Deep Learning, Random Forest Classifiers, Feature extraction from audio, images, clustering algorithms, or combinations thereof.

In embodiments, a convolutional neural network (CNN) may be utilized. For example, a convolutional neural network (CNN) may be used as an ANN that, in a field of machine learning, for example, is a class of deep, feed-forward ANNs applied for audio-visual analysis of the captured disturbances. CNNs may be shift or space invariant and utilize shared-weight architecture and translation invariance characteristics. Additionally or alternatively, a recurrent neural network (RNN) may be used as an ANN that is a feedback neural network. RNNs may use an internal memory state to process variable length sequences of inputs to generate one or more outputs. In RNNs, connections between nodes may form a DAG along a temporal sequence. One or more different types of RNNs may be used such as a standard RNN, a Long Short Term Memory (LSTM) RNN architecture, and/or a Gated Recurrent Unit RNN architecture.

The disturbance detection analytics module 212, the disturbance detection training model module 212A, and the machine learning module 216 are coupled to the communication path 202 and communicatively coupled to the processor 204. As will be described in further detail below, the processor 204 may process the input signals received from the system modules and/or extract information from such signals.

Data stored and manipulated in the intelligent disturbance detection system 200 as described herein is utilized by the machine learning module 216, which in embodiments able to leverage a cloud computing-based network configuration such as the cloud to apply machine learning and artificial intelligence or may be able to rely on an internal architecture of the application tool 226 to apply machine learning and artificial intelligence as described herein. This machine learning application may create models that can be applied by the intelligent machine learning and artificial intelligence system 200, to make it more efficient and intelligent in execution. As an example and not a limitation, the machine learning module 216 may include artificial intelligence components selected from the group consisting of an artificial intelligence engine, Bayesian inference engine, and a decision-making engine, and may have an adaptive learning engine further comprising a deep neural network learning engine.

The intelligent disturbance detection system 200 comprises the network interface hardware 218 for communicatively coupling the intelligent disturbance detection system 200 with a computer network such as network 222. The network interface hardware 218 is coupled to the communication path 202 such that the communication path 202 communicatively couples the network interface hardware 218 to other modules of the intelligent disturbance detection system 200. The network interface hardware 218 can be any device capable of transmitting and/or receiving data via a wireless network. Accordingly, the network interface hardware 218 can comprise a communication transceiver for sending and/or receiving data according to any wireless communication standard. For example, the network interface hardware 218 can comprise a chipset (e.g., antenna, processors, machine readable instructions, etc.) to communicate over wired and/or wireless computer networks such as, for example, wireless fidelity (Wi-Fi), WiMax, Bluetooth, IrDA, Wireless USB, Z-Wave, ZigBee, or the like.

Referring to FIG. 3B, a smart device sub-system of the mobile smart device 250 is configured to operate within the system 200. As shown in FIG. 3B, the mobile smart device 250 may include a processor 204, a memory component 206, the application tool 226, a display device 228, a user input device 230, a camera 232, and a microphone 234. The display device 228 may be a display of the mobile smart device 250, and the user input device 230 may be a graphical user interface of the mobile smart device 250. The camera 232 and the microphone 232 may be communicatively coupled to and configure to operate with the disturbance capture module 208.

Referring to FIG. 3C, an application tool-subsystem is configured to operate within the system 200. As shown in FIG. 3C, the application tool 226 may include a pre-processing module 236, a feature extraction module 238, a feature mapping module 240, a predict event module 242, the disturbance detection analytics module 212, a persistence layer 244, a configuration module 246, and an alerting module 248. The pre-processing module 236 may be communicatively coupled to and configured to operate with the disturbance capture module 208. The feature extraction module 238, the feature mapping module 240, the predict event module 242, the persistence layer 244, the configuration module 246, and the alerting module 248 are communicatively coupled to and configured to operate as components of the disturbance detection analytics module 212 of the application tool 226. The persistence layer 244 may be a communicatively coupled to and a component of the database 214 described herein. In embodiments, the persistence layer 244 may store event data of monitored disturbances as described herein, and the configuration module 246 may control configuration of settings associated with the application tool 226.

As noted above, FIG. 3D illustrates another computer implemented system 200 having an external communication architecture broader than the self-contained architecture of FIG. 3A and is directed to one or more open system embodiments. The system 200 of FIG. 3D is similar to the system 200 of FIG. 3A as described herein with differences such as a server 220 and a computing device 224 remote from the mobile smart device 250. Further, the intelligent disturbance detection system 200 of FIG. 3D comprises an intelligent disturbance detection module 201B of the external communication architecture as a component of the machine learning disturbance detection model 108 of FIG. 1 to generate the one or more generated disturbance labels 120. With respect to the external communication architecture of the intelligence disturbance detection module 201B of FIG. 3D, the application tool 226 may be downloaded to the mobile smart device 250 and/or the computing device 224 through a network 222, and the mobile smart device 250, the computing device 224, and the server 220 may be communicatively coupled to share information provided by and with respect to the application tool 226. The smart device and application tool sub-systems of FIGS. 3B and 3C are configured to also operate with respect to the system 200 of FIG. 3D.

Referring to FIG. 3D, data from various applications running on computing device 224 can be provided from the computing device 224 to the intelligent disturbance detection system 200 via the network interface hardware 218. The computing device 224 can be any device having hardware (e.g., chipsets, processors, memory, etc.) for communicatively coupling with the network interface hardware 218 and a network 222. Specifically, the computing device 224 can comprise an input device having an antenna for communicating over one or more of the wireless computer networks described above.

While only one server 220 and one computing device 224 is illustrated, the intelligent disturbance detection system 200 can comprise multiple servers containing one or more applications and computing devices. The computing device 224 may include digital systems and other devices permitting connection to and navigation of the network. It is contemplated and within the scope of this disclosure that the computing device 224 may be a personal computer, a laptop device, a mobile smart device such as a smartphone or smart pad or tablet, or the like. Other intelligent disturbance detection system 200 variations allowing for communication between various geographically diverse components are possible. The lines depicted in FIG. 2 indicate communication rather than physical connections between the various components.

The network 222 can comprise any wired and/or wireless network such as, for example, wide area networks, metropolitan area networks, the internet, an intranet, satellite networks, or the like. Accordingly, the network 222 can be utilized as a wireless access point by the computing device 224 to access one or more servers (e.g., a server 220). The server 220 and any additional servers generally comprise processors, memory, and chipset for delivering resources via the network 222. Resources can include providing, for example, processing, storage, software, and information from the server 220 to the intelligent disturbance detection system 200 via the network 222. Additionally, it is noted that the server 220 and any additional servers can share resources with one another over the network 222 such as, for example, via the wired portion of the network, the wireless portion of the network, or combinations thereof. While the intelligent disturbance detection system 200 is illustrated as a single, integrated system in FIG. 3B, in other embodiments, the systems can be independent systems.

In embodiments, the machine learning disturbance detection model 108 of FIG. 1 may be communicatively to a "big data" environment including a database 214 of the intelligent disturbance detection module 201B of the external communication architecture of FIG. 3D configured to store and process large volumes of data in such an environment. The application tool 226 may be configured to be communicatively coupled to the database 214 of such a "big data" environment such that the application tool 226 may communicate with one or more external devices, systems, or application tools across technical platforms. The database 214 may be, for example, a structured query language (SQL) database or a like database that may be associated with a relational database management system (RDBMS) and/or an object-relational database management system (ORDBMS). The database 214 may be any other large-scale storage and retrieval mechanism whether a SQL, SQL including, or a non-SQL database. For example, the database 214 may utilize one or more big data storage computer architecture solutions. Such big data storage solutions may support large data sets in a hyperscale and/or distributed computing environment, which may, for example, include a variety of servers utilizing direct-attached storage (DAS). Such database environments may include Hadoop, NoSQL, and Cassandra that may be usable as analytics engines. Thus, while SQL may be referenced herein as an example database that is used with the tool described herein, it is understood that any other such type of database capable of support large amounts of database, whether currently available or yet-to-be developed, and as understood to those of ordinary skill in the art, may be utilized with the tool described herein as well.

Figure 5:
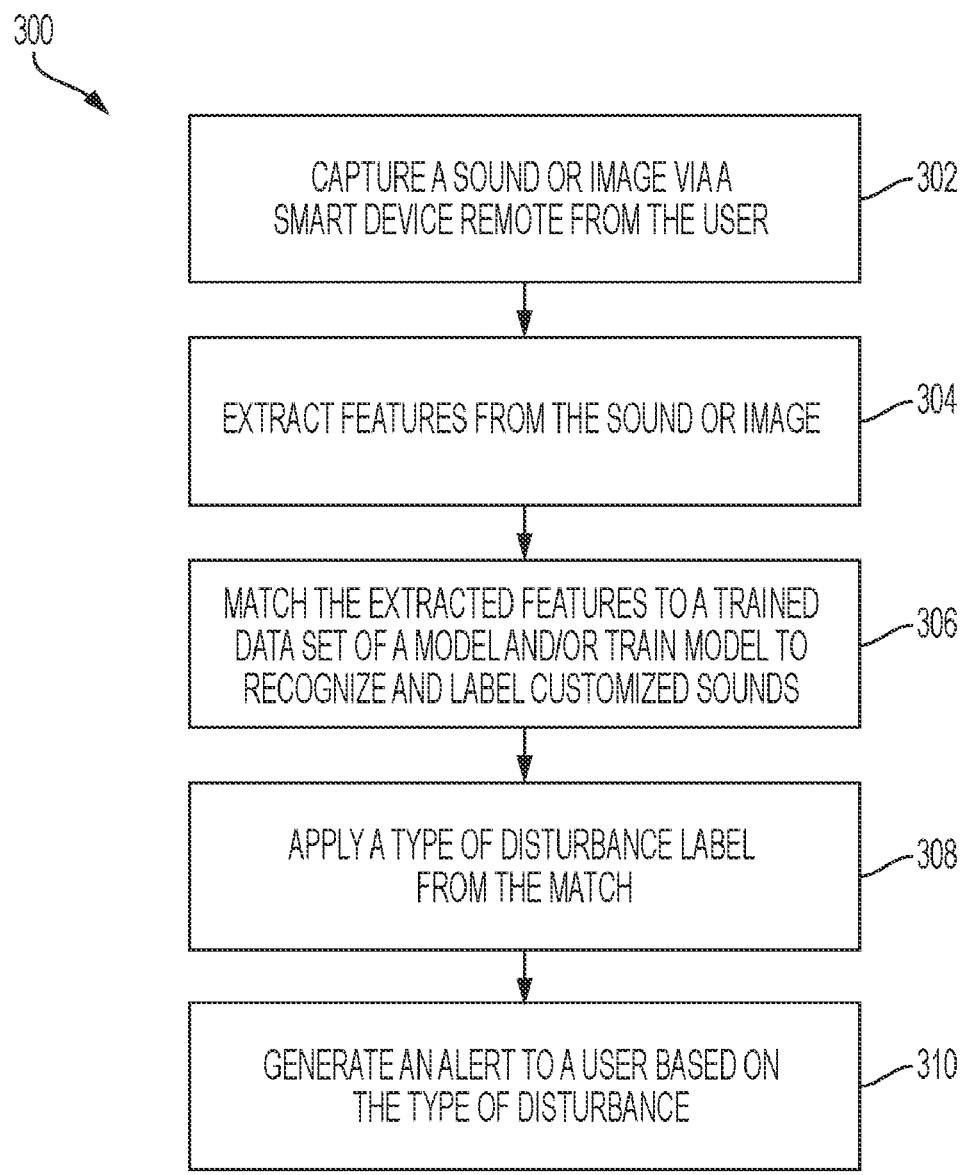
FIG. 5 illustrates a flowchart process for use of the intelligent disturbance detection solution of FIGS. 1-2 and the intelligent disturbance detection module and system of FIG. 3, according to one or more embodiments shown and described herein.

Referring to FIG. 5, a process 300 is shown for use with the disturbance detection training model module 212A and the disturbance detection analytics module 212 and the intelligent disturbance detection system 200 of FIG. 3A or 3D to generate the one or more generated disturbance labels 120 determinations based on disturbance detection analysis as described herein. In embodiments, the intelligent disturbance detection system 200 may include the mobile smart device 250 remote from a user, and an application tool 226 downloaded on the mobile smart device 250. The application tool 226 may include a disturbance detection neural network model, such as the machine learning disturbance detection model 108, and a disturbance set. The disturbance set may include one or more disturbance labels, such as the one or more trained file disturbance input labels 104 of FIG. 1. Referring to FIG. 3A, the intelligent disturbance detection system 200 may include the processor 204 of the mobile smart device 250 communicatively coupled to the application tool 226, the memory component 206 of the mobile smart device 250, and machine readable instructions stored in the memory component 206 that cause the intelligent disturbance detection system 200 to perform a control scheme or process as described herein, such as the intelligent disturbance detection solution 100 and/or the process 300, when executed by the processor 204 of the mobile smart device 250. Referring to FIG. 3D, the intelligent disturbance detection system 200 may further include one or more processors 204 communicatively coupled to the application tool 226, one or more memory components 206 communicatively coupled to the one or more processors 204, and machine readable instructions stored in the one or more memory components 206 that cause the intelligent disturbance detection system 200 to perform a control scheme or process as described herein, such as the intelligent disturbance detection solution 100 and/or the process 300, when executed by the one or more processors 204.

The machine readable instructions may cause the intelligent disturbance detection system 200 when executed by the one or more processors 204 to capture a disturbance, such as through the monitored disturbance data 110, comprising a sound, an image, or combinations thereof via the application tool 226 on the mobile smart device 250 remote from the user, and extract features from the disturbance to generate one or more extracted features. As a non-limiting example, the process 300 includes a block 302 to capture a disturbance via the mobile smart device 250 even when the mobile smart device 250 is remote from the user. By way of example, and not as a limitation, the mobile smart device 250 may be configured to use the application tool 226 as described herein to monitor an environment, such as a home environment, when the user is from home. In embodiments, the disturbance may be a sound and/or image from which features are extracted in block 304. The pre-processing module 236 of the disturbance capture module 208 of the application tool 226 may be utilized to capture and process disturbance information as described herein.

In block 306, the extracted features are matched to a trained data set of a machine learning disturbance detection model 108 and/or train the machine learning disturbance detection model 108 to recognize and label customized disturbances, such as sounds, by the intelligent disturbance detection system 200 as described herein. The feature extraction module 236 of the disturbance detection analytics module 212 of the application tool 226 may be utilized to extract features from the captured disturbance information as described herein.

In block 308, a type of disturbance label is determined and applied based on the match of the block 306. The feature mapping module 240 of the disturbance detection analytics module 212 of the application tool 226 may be utilized to map extracted features to stored matching disturbance labels as described herein. The predict event module 242 of the disturbance detection analytics module 212 of the application tool 226 may then be utilized to predict the monitored event based on the matching disturbance label as described herein. As a non-limiting example, in some embodiments, the machine readable instructions may cause the intelligent disturbance detection system 200 when executed by the one or more processors 204 to compare the one or more extracted features to the one or more disturbance labels (e.g., the one or more trained file disturbance input labels 104 of FIG. 1) in a comparison by the disturbance detection neural network model (e.g., the machine learning disturbance detection model 108 of FIG. 1), generate a disturbance label 120 from the one or more disturbance labels when the one or more extracted features match the disturbance label in the comparison, and train the disturbance detection neural network model to generate a custom disturbance label 120 associated with the one or more extracted features 116 when the one or more extracted features 116 do not match the one or more disturbance labels (e.g., of the one or more trained file disturbance input labels 104 of FIG. 1) in the comparison. In embodiments, the disturbance label 120 may include an identification of one of a dog barking sound, a fire alarm sound, or a doorbell ringing sound, and the custom disturbance label 120 may include an identification of a door opening sound.

In some embodiments, the machine readable instructions may cause the intelligent disturbance detection system 200 when executed by the one or more processors 204 to transmit instructions to add the custom disturbance label 120 to the disturbance set based on an approval of the user, which may include a user setting of the custom disturbance label 120. The user setting may be directed to a naming of the custom disturbance label, an upload by the user of an image for the custom disturbance label, or combinations thereof. In embodiments, the machine readable instructions may cause the intelligent disturbance detection system 200 when executed by the one or more processors 204 to upload an image associated with the custom disturbance label 120 and add the custom disturbance label 120 to the disturbance set (e.g., the one or more trained file disturbance input labels 104 of FIG. 1).

In block 310 of the process 300 of FIG. 5, an alert 262 is generated as described herein and transmitted to a user based on the type of disturbance label 120 determined and generated. The alerting module 248 of the application tool 226 may be utilized to extract one or more patterns from the captured disturbance information as described herein. The alert 262 may be, for example, sent to a text or an email as set by the user in the application tool 226. The user may set the text via an input phone number and/or one or more email addresses to which to send the alerts 262, may set a recording frequency as described in greater detail below, and may select a feature on the application tool 226 to start monitoring for monitored disturbance data 110 to generate the one or more alerts 262 per the recording frequency set. The application 226 may generate an image or sound clip to send as the alert 262 corresponding to a generated disturbance label 120 as described herein. In some embodiments, the application tool 226 may generate one or more snapshot screen views to send as the alert 262 corresponding to the generated disturbance label 120 as described herein. In embodiments, a sound clip or other disturbance clip associated with the disturbance of the monitored disturbance data 110 corresponding to the alert 262 may be sent as part of the alert 262 for the user to review. As a non-limiting example, the sound clip or other disturbance clip can be attached for review with the one or more snapshot screen views sent to the user as the alert 262.

In some embodiments, a user may customize selection of which types of generated disturbance labels 120 from the monitored disturbance data 110 are to generate alerts 262 to send to the user. The user may add or remove disturbance labels 120 already stored in the intelligent disturbance detection system 200 (e.g., as the one or more trained file disturbance input labels 104 of FIG. 1) for which alerts 262 may be sent. Thus, the user may customize which alerts 262 the user desires to receive and at what frequency the user wishes to receive the selected alerts 262.

In some embodiments, the machine readable instructions may cause the intelligent disturbance detection system 200 when executed by the one or more processors 204 to generate an automatic alert 262 via the mobile smart device 250 to transmit an identification of the disturbance to the user based on the disturbance label 120, the custom disturbance label 120, or combinations thereof. The automatic alert 262 may include a text to the user, an email to the user, or combinations thereof. The user may set up information associated with the text and the email to which to send the notification in the application tool 226. The application tool 226 may be configured to transmit the automatic alert to a second device of the user at which, for example, the user may receive the automatic alert 262 as the text, the email, or combinations thereof. In embodiments, the automatic alert 262 may include a timestamp associated with the identification of the disturbance, a confidence level associated with the identification of the disturbance, or combinations thereof. The automatic alert 262 may include a display graph 270 over a period of time, which may include at least one disturbance time portion associated with the identification of the disturbance. The display graph 270 may include at least one time portion not associated with the identification of the disturbance. In embodiments, the automatic alert 262 may include a display graph 270 over a period of time that includes at least one disturbance time portion associated with a disturbance detection including the identification of the disturbance, identification of another disturbance from the disturbance set, or combinations thereof, and the display graph 270 over the period of time may include at least one time portion not associated with the disturbance detection.

The user may also set a recording frequency in the application tool 226. The recording frequency may include a predetermined time period in which to monitor the monitored disturbance data 110 by the application tool 226 of the mobile smart device 250. The application tool 226 may be configured to generate the automatic alert based on a frequency associated with the automatic alert 262. The frequency may include a number of times to send the automatic alert 262, a time period within which to send the automatic alert as one or more alerts 262, a time period between each subsequent automatic alert 262 of the automatic alert 262, or combinations thereof. In embodiments, a number of alerts 262 may be set for a particular generated disturbance label 120 and/or a number of iterations in a time period may be set for the particular generated disturbance label 120. As a non-limiting example, an alert 262 of a fire alarm may be set to be sent to the user via text and/or email two times. Additionally or alternatively, the one or more alerts 262 of the first alarm may be sent in iterations such as every 15 minutes until the alert 262 is cleared or otherwise handled. The application tool 226 may include a feature configured to clear an alert 262.

In embodiments, the intelligent disturbance detection solution systems and methods as described herein assist to significantly reduce inefficiencies associated with disturbance detection by efficiently handling disturbance detection determinations in a first instance to result in faster disturbance classification and identification, for example. As a non-limiting example, such disturbances may be received via application tools 226. The intelligent disturbance detection solution systems and methods provide a more efficient and customizable processing system to efficiently and automatically handle disturbance detection determinations, effectively reducing a use of processing power while optimizing system usage and efficiencies, while further allowing for a use of mobile smart devices 250 that may be older models no longer carried by a user and utilized as a primary smart device.

In some embodiments, the intelligent disturbance detection solution systems and methods may be directed to an application tool 226 downloaded on a mobile smart device 250 that does not store the monitored disturbance data 110 from a monitoring session. The monitored disturbance data 110 from the monitoring session may be received by the application 226 and analyzed in slices of a continuous monitoring during the monitoring session to determine a primary disturbance, such as a loudest sound, from which to extract features. The extracted features from the primary disturbance are used by the machine learning disturbance detection model 108 to generate the generated disturbance labels 120 as described herein. A secondary disturbance in a slice may become a new primary disturbance in another slice such that the application tool 226 is configured to extract features from the new primary disturbance during the monitoring session during the continuous monitoring.

In some embodiments as described herein, the intelligent disturbance detection solution systems and methods may be directed to an application tool 226 downloaded on a mobile smart device 250 that is not paired with other devices such that data in kept private and stored local in the mobile smart device 250 and alerts 262 are generated via text and/or email, such as through transmission by a home wireless fidelity (wi-fi) network to which the mobile smart device 250 is connected and communicatively coupled. In alternative embodiments, the intelligent disturbance detection solution systems and methods described herein may include an application tool 226 configured to be downloaded on multiple paired smart devices. The application tool 226 on the mobile smart device 250 may be configured to recognize and approve one or more smart devices for pairing and sharing of data by the application tool 226, such as one or more smart devices found on the same home wi-fi network to which the mobile smart device 250 is connected. In some embodiments, different mobile smart devices 250 may include respectively downloaded different application tools 226 that are not in communication with and do not share data with one or another. In some embodiments, creation of a custom disturbance label 120 on a first application tool 226 on a first mobile smart device 250 may not cause a corresponding creation of the custom disturbance label 120 in a second application tool 226 on a second mobile smart device 250, even in the same home wi-fi network. In other embodiments, creation of a custom disturbance label 120 on the first application tool 226 on the first mobile smart device 250 may cause a corresponding creation of the custom disturbance label 120 in the second application tool 226 on the second mobile smart device 250 if both the first and second mobile smart devices 250 are communicatively coupled via a common user account associated with both the first and second application tools 226.

In some embodiments as described herein, the intelligent disturbance detection solution systems and methods may be directed to an application tool 226 downloaded on a mobile smart device 250 that is static and does not access external networks such as cloud-based servers. In alternative embodiments, the intelligent disturbance detection solution systems and methods described herein may include an application tool 226 configured to dynamically access external networks and/or be operational between paired mobile smart devices 250.

In other embodiments as described herein, the intelligent disturbance detection solution systems and methods may be directed to an application tool 226 downloaded on a mobile smart device 250 that is configured to send third party security alerts and/or monitored disturbance data 110 information. By way of example, and not as a limitation, alerts 262 may be sent to a security agency monitoring a home, to other security enforcement agencies, and/or to an insurance agency. The insurance agency may insure the home being monitored by the application tool 226, for instance. Alternatively or additionally, the insurance agency may use an insurance company system coupled to a plurality of application tools 226 in a predetermined area to receive the respective alerts 262 from monitored disturbance data 110 information, such as from multiple homes, to generate metrics. The metrics may be used to determine parameters such as a safety in the area parameter based on a number of alerts 262 received of one or more types of generated disturbance labels 120.

For the purposes of describing and defining the present disclosure, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" or "programmed" in a particular way, to embody a particular property, or to function in a particular manner, are structural recitations, as opposed to recitations of intended use.

It is noted that terms like "preferably," "commonly," and "typically," when utilized herein, are not utilized to limit the scope of the claimed disclosure or to imply that certain features are critical, essential, or even important to the structure or function of the claimed disclosure. Rather, these terms are merely intended to identify particular aspects of an embodiment of the present disclosure or to emphasize alternative or additional features that may or may not be utilized in a particular embodiment of the present disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present disclosure, it is noted that this term is introduced in the claims as an open-ended transitional phrase that is used to introduce a recitation of a series of characteristics of the structure and should be interpreted in like manner as the more commonly used open-ended preamble term "comprising."

ASPECTS LISTING

Aspect 1. An intelligent disturbance detection system comprising a mobile smart device remote from a user, an application tool downloaded on the mobile smart device, one or more processors communicatively coupled to the application tool, one or more memory components communicatively coupled to the one or more processors, and machine readable instructions stored in the one or more memory components. The application tool comprises a disturbance detection neural network model and a disturbance set, and the disturbance set comprises one or more disturbance labels. The machine readable instructions cause the intelligent disturbance detection system to perform at least the following when executed by the one or more processors: capture a disturbance comprising a sound, an image, or combinations thereof via the application tool on the mobile smart device remote from the user, extract features from the disturbance to generate one or more extracted features, compare the one or more extracted features to the one or more disturbance labels in a comparison by the disturbance detection neural network model, and generate a disturbance label from the one or more disturbance labels when the one or more extracted features match the disturbance label in the comparison. The machine readable instructions further cause the intelligent disturbance detection system to perform at least the following when executed by the one or more processors: train the disturbance detection neural network model to generate a custom disturbance label associated with the one or more extracted features when the one or more extracted features do not match the one or more disturbance labels in the comparison, and generate an automatic alert via the mobile smart device to transmit an identification of the disturbance to the user based on the disturbance label, the custom disturbance label, or combinations thereof.

Aspect 2. The intelligent disturbance detection system of Aspect 1, wherein the automatic alert comprises a text to the user, an email to the user, or combinations thereof.

Aspect 3. The intelligent disturbance detection system of Aspect 1 or Aspect 2, further comprising machine readable instructions that cause the intelligent disturbance detection system to perform at least the following when executed by the one or more processors: transmit the automatic alert to a second device of the user.

Aspect 4. The intelligent disturbance detection system of any of Aspect 1 to Aspect 3, further comprising machine readable instructions that cause the intelligent disturbance detection system to perform at least the following when executed by the one or more processors: generate the automatic alert based on a frequency associated with the automatic alert, the frequency comprising a number of times to send the automatic alert, a time period within which to send the automatic alert as one or more alerts, a time period between each subsequent automatic alert of the automatic alert, or combinations thereof.

Aspect 5. The intelligent disturbance detection system of any of Aspect 1 to Aspect 4, wherein the automatic alert comprises a timestamp associated with the identification of the disturbance.

Aspect 6. The intelligent disturbance detection system of any of Aspect 1 to Aspect 5, wherein the automatic alert comprises a confidence level associated with the identification of the disturbance.

Aspect 7. The intelligent disturbance detection system of any of Aspect 1 to Aspect 6, wherein the automatic alert comprises a display graph over a period of time, the display graph over the period of time comprising at least one disturbance time portion associated with the identification of the disturbance.

Aspect 8. The intelligent disturbance detection system of Aspect 7, wherein the display graph comprises at least one time portion not associated with the identification of the disturbance.

Aspect 9. The intelligent disturbance detection system of any of Aspect 1 to Aspect 8, wherein the automatic alert comprises a display graph over a period of time, the display graph over the period of time comprising at least one disturbance time portion associated with a disturbance detection, the disturbance detection comprising the identification of the disturbance, an identification of another disturbance from the disturbance set, or combinations thereof.

Aspect 10. The intelligent disturbance detection system of Aspect 9, wherein the display graph over the period of time comprises at least one time portion not associated with the disturbance detection.

Aspect 11. The intelligent disturbance detection system of any of Aspect 1 to Aspect 10, wherein the disturbance label comprises the identification of one of a dog barking sound, a fire alarm sound, or a doorbell ringing sound.

Aspect 12. The intelligent disturbance detection system of any of Aspect 1 to Aspect 11, wherein the custom disturbance label comprises the identification of a door opening sound.

Aspect 13. The intelligent disturbance detection system of any of Aspect 1 to Aspect 12, wherein the application tool is configured to transmit instructions to add the custom disturbance label to the disturbance set based on an approval of the user, the approval of the user comprising a user setting of the custom disturbance label.

Aspect 14. The intelligent disturbance detection system of Aspect 13, wherein the user setting comprises a naming of the custom disturbance label, an upload by the user of an image for the custom disturbance label, or combinations thereof.

Aspect 15. The intelligent disturbance detection system of any of Aspect 1 to Aspect 14, further comprising machine readable instructions that cause the intelligent disturbance detection system to perform at least the following when executed by the one or more processors: upload an image associated with the custom disturbance label, and add the custom disturbance label to the disturbance set.

Aspect 16. A method of implementing an intelligent disturbance detection system, the method comprising capturing a disturbance comprising a sound, an image, or combinations thereof via an application tool on a mobile smart device of the intelligent disturbance detection system remote from a user, extracting features from the disturbance to generate one or more extracted features, comparing the one or more extracted features to one or more disturbance labels of a disturbance set in a comparison by a disturbance detection neural network model of the application tool, and generating a disturbance label from the one or more disturbance labels when the one or more extracted features match the disturbance label in the comparison. The method further comprises training the disturbance detection neural network model to generate a custom disturbance label associated with the one or more extracted features when the one or more extracted features do not match the one or more disturbance labels in the comparison, and generating an automatic alert via the mobile smart device to transmit an identification of the disturbance to the user based on the disturbance label, the custom disturbance label, or combinations thereof.

Aspect 17. The method of Aspect 16, further comprising generating the automatic alert based on a frequency associated with the automatic alert, the frequency comprising a number of times to send the automatic alert as one or more alerts, a time period within which to send the automatic alert as the one or more alerts, a time period between each subsequent automatic alert of the automatic alert, or combinations thereof.

Aspect 18. The method of Aspect 17, further comprising setting by the user a name of the custom disturbance label during an approval of the user, uploading by the user an image for the custom disturbance label during the approval of the user, and adding the custom disturbance label to the disturbance set based on the approval of the user.

Aspect 19. A method of implementing an intelligent disturbance detection system, the method comprising capturing a disturbance comprising a sound, an image, or combinations thereof via an application tool on a mobile smart device of the intelligent disturbance detection system remote from a user, extracting features from the disturbance to generate one or more extracted features, comparing the one or more extracted features to one or more disturbance labels of a disturbance set in a comparison by a disturbance detection neural network model of the application tool, generating a disturbance label from the one or more disturbance labels when the one or more extracted features match the disturbance label in the comparison, training the disturbance detection neural network model to generate a custom disturbance label associated with the one or more extracted features when the one or more extracted features do not match the one or more disturbance labels in the comparison, and generating an automatic alert via the mobile smart device to transmit an identification of the disturbance to the user based on the disturbance label, the custom disturbance label, or combinations thereof, wherein the automatic alert comprises a timestamp and a confidence level associated with the identification of the disturbance.

Aspect 20. The method of Aspect 19, wherein the automatic alert further comprises a display graph over a period of time, the display graph over the period of time comprising at least one disturbance time portion associated with the identification of the disturbance.

The invention claimed is:

1. An intelligent disturbance detection system comprising:
an application tool executed by a mobile smart device, the application tool comprising a disturbance set;
one or more processors communicatively coupled to the application tool;
one or more memory components communicatively coupled to the one or more processors; and
machine readable instructions stored in the one or more memory components that cause the intelligent disturbance detection system to perform at least the following when executed by the one or more processors:
capture a disturbance comprising a sound, an image, or combinations thereof via the application tool on the mobile smart device remote from a user;
extract features from the disturbance to generate one or more extracted features;
compare the one or more extracted features to the disturbance set in a comparison;
update the disturbance set when the one or more extracted features fail to match the disturbance set in the comparison;
generate an automatic alert via the mobile smart device to transmit an identification of the disturbance to the user based on the disturbance set, the updated disturbance set, or combinations thereof; and
generate the automatic alert based on a frequency associated with the automatic alert, the frequency comprising a number of times to send the automatic alert, a time period within which to send the automatic alert as one or more alerts, a time period between each subsequent automatic alert of the automatic alert, or combinations thereof.

2. The intelligent disturbance detection system of claim 1, wherein the automatic alert comprises a text to the user, an email to the user, or combinations thereof.

3. The intelligent disturbance detection system of claim 1, further comprising machine readable instructions that cause the intelligent disturbance detection system to perform at least the following when executed by the one or more processors:
transmit the automatic alert to a second device of the user.

4. The intelligent disturbance detection system of claim 1, wherein the automatic alert comprises a timestamp associated with the identification of the disturbance.

5. The intelligent disturbance detection system of claim 1, wherein the automatic alert comprises a confidence level associated with the identification of the disturbance.

6. The intelligent disturbance detection system of claim 1, wherein the automatic alert comprising a display graph that comprises at least one time portion not associated with the identification of the disturbance.

7. The intelligent disturbance detection system of claim 1, wherein the automatic alert comprises a display graph over a period of time, the display graph over the period of time comprising at least one disturbance time portion associated with a disturbance detection, the disturbance detection comprising the identification of the disturbance, an identification of another disturbance from the disturbance set, or combinations thereof.

8. The intelligent disturbance detection system of claim 7, wherein the display graph over the period of time comprises at least one time portion not associated with the disturbance detection.

9. The intelligent disturbance detection system of claim 1, wherein the disturbance set comprises the identification of one of a dog barking sound, a fire alarm sound, or a doorbell ringing sound.

10. The intelligent disturbance detection system of claim 1, wherein the disturbance set comprises the identification of a door opening sound.

11. The intelligent disturbance detection system of claim 1, wherein the user setting comprises a naming of a disturbance in the disturbance set, an upload by the user of an image for the disturbance set, or combinations thereof.

12. The intelligent disturbance detection system of claim 1, further comprising machine readable instructions that cause the intelligent disturbance detection system to perform at least the following when executed by the one or more processors:
add an image to the updated disturbance set.

13. A method of implementing an intelligent disturbance detection system, the method comprising:
capturing a disturbance comprising a sound, an image, or combinations thereof via an application tool on a mobile smart device of the intelligent disturbance detection system remote from a user;
extracting features from the disturbance to generate one or more extracted features;
comparing the one or more extracted features to one or more disturbances of a disturbance set in a comparison by the application tool;
generating a disturbance from the one or more disturbances when the one or more extracted features match the disturbance in the comparison;
generate a new disturbance for the disturbance set associated with the one or more extracted features when the one or more extracted features do not match the one or more disturbances in the comparison;
generating an automatic alert via the mobile smart device to transmit an identification of the disturbance to the user based on the disturbance match, the new disturbance, or combinations thereof, and
generating the automatic alert based on a frequency associated with the automatic alert, the frequency comprising a number of times to send the automatic alert as one or more alerts, a time period within which to send the automatic alert as the one or more alerts, a time period between each subsequent automatic alert of the automatic alert, or combinations thereof.

14. A method of implementing an intelligent disturbance detection system, the method-comprising:
capturing a disturbance comprising a sound, an image, or combinations thereof via an application tool on a mobile smart device of the intelligent disturbance detection system remote from a user;
extracting features from the disturbance to generate one or more extracted features;
comparing the one or more extracted features to one or more disturbances of a disturbance set in a comparison by the application tool;
generating a disturbance from the one or more disturbances when the one or more extracted features match the disturbance in the comparison;
generate a new disturbance for the disturbance set associated with the one or more extracted features when the one or more extracted features do not match the one or more disturbances in the comparison;
setting by the user a name of the new disturbance during an approval of the user;
uploading by the user an image for the new disturbance during the approval of the user;
adding the new disturbance to the disturbance set based on the approval of the user; and
generating an automatic alert via the mobile smart device to transmit an identification of the disturbance to the user based on the disturbance match, the new disturbance, or combinations thereof, wherein the automatic alert comprises a timestamp and a confidence level associated with the identification of the disturbance.

15. The method of claim 14, wherein the automatic alert further comprises a display graph over a period of time, the display graph over the period of time comprising at least one disturbance time portion associated with the identification of the disturbance.

* * * * *